(No Model.) 3 Sheets—Sheet 2.
G. W. HAMMOND.
APPARATUS FOR CAUSTICIZING SODA, &c.
No. 381,996. Patented May 1, 1888.
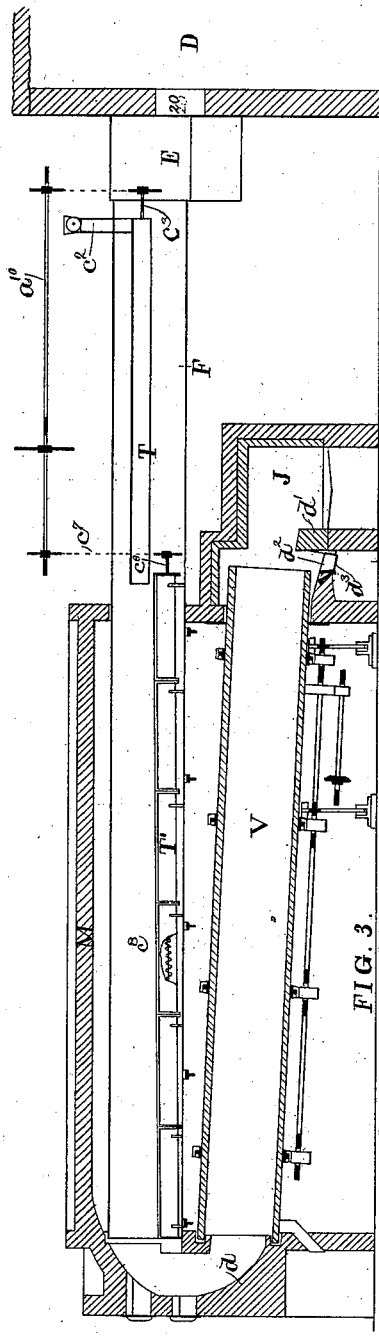
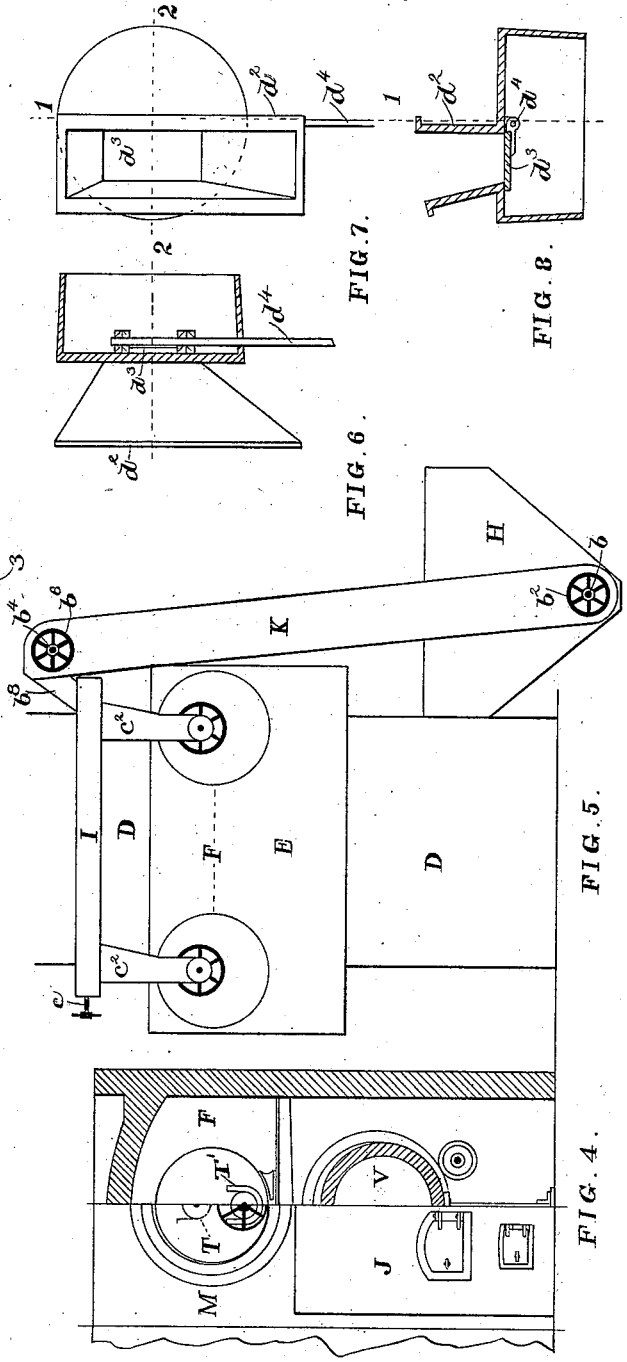
Witnesses:
Fred L. Emery
Fred S. Greenleaf
Inventor.
George W. Hammond
per Crosby & Gregory
Attorney.

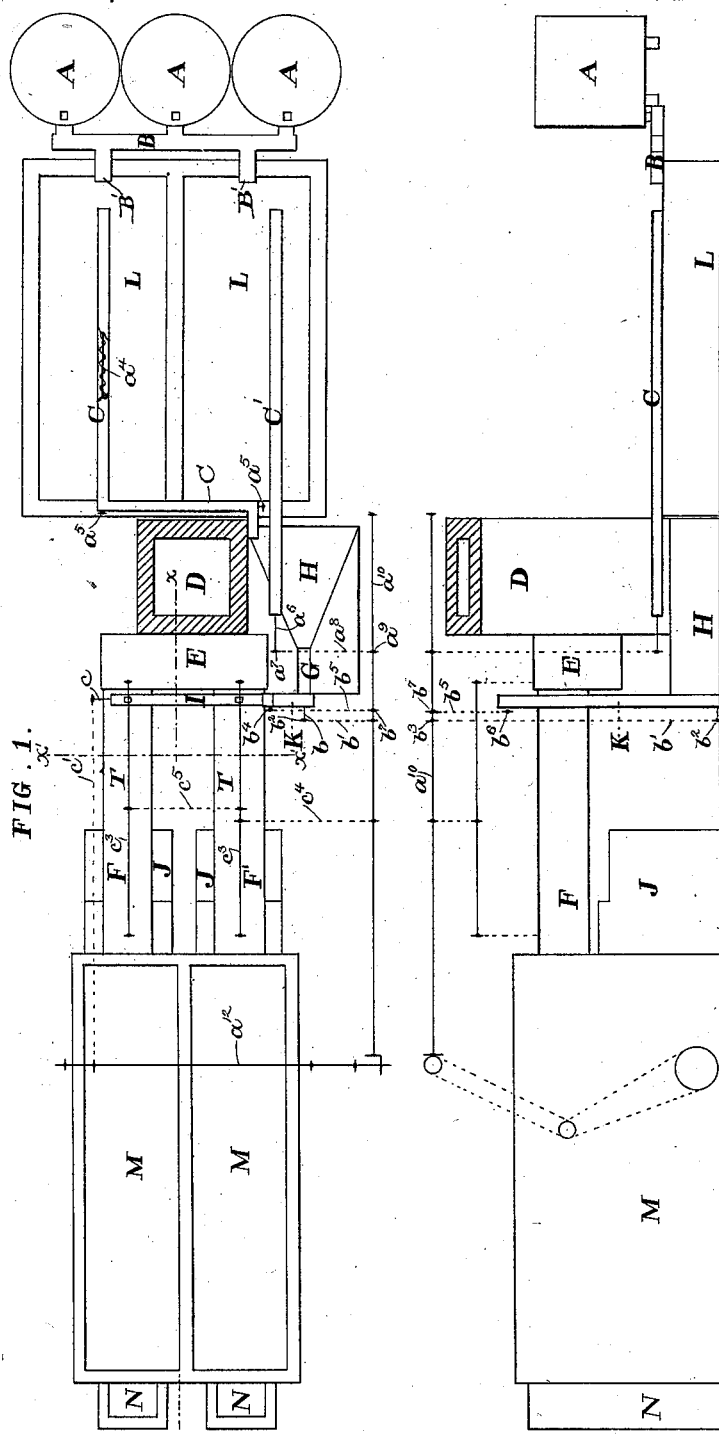

(No Model.) 3 Sheets—Sheet 3.
G. W. HAMMOND.
APPARATUS FOR CAUSTICIZING SODA, &c.
No. 381,996. Patented May 1, 1888.
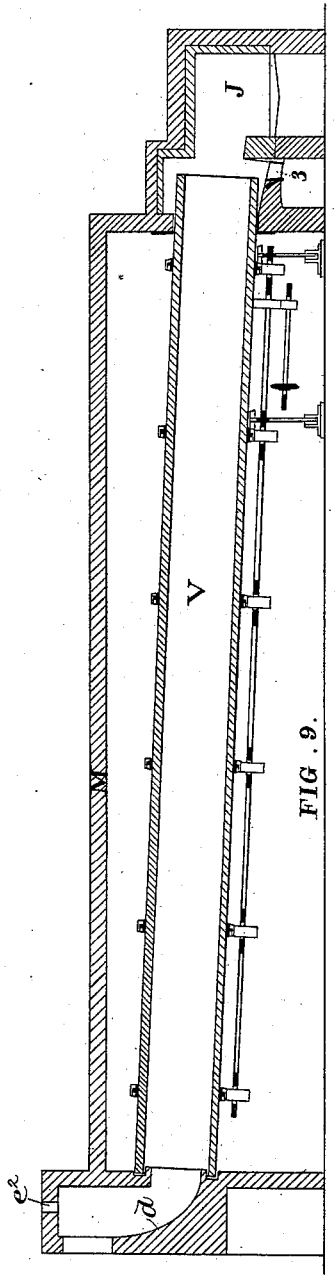
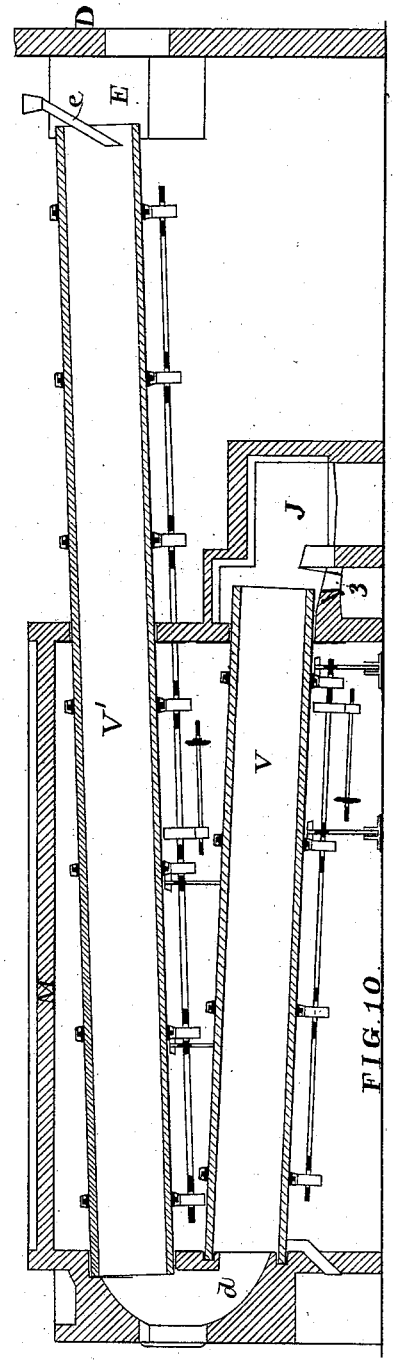

UNITED STATES PATENT OFFICE.

GEORGE W. HAMMOND, OF BOSTON, MASSACHUSETTS.

APPARATUS FOR CAUSTICIZING SODA, &c.

SPECIFICATION forming part of Letters Patent No. 381,996, dated May 1, 1888.

Application filed April 5, 1887. Serial No. 233,740. (No model.)

*To all whom it may concern:*

Be it known that I, GEORGE W. HAMMOND, of Boston, county of Suffolk, and State of Massachusetts, have invented an Improvement in Methods of and Apparatus for Causticizing Soda and other Chemicals, of which the following description, in connection with the accompanying drawings, is a specification, like letters on the drawings representing like parts.

This invention has for its object to provide a novel method of and apparatus for the recovery of lime employed in causticizing soda and other chemicals.

My improved method and apparatus will be hereinafter fully described as employed in recovering the lime used to causticize the soda which is employed in pulp-mills in the treatment of wood or other fiber.

As now commonly practiced in pulp-mills, the soda, in the form of a carbonate, is dissolved in water, and to this solution is added oxide of lime or quicklime. The carbonate of soda is thus changed to caustic soda, while carbonate of lime is formed, as may be represented by the following reaction:

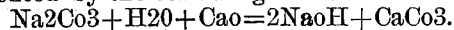

$Na_2Co_3 + H_2O + Cao = 2NaoH + CaCo_3.$

The caustic soda formed according to the above reaction remains in solution, while the carbonate of lime, being insoluble, settles to the bottom. The caustic soda may be siphoned off, or it may be filtered in any usual manner, it being commonly filtered through a bed of sand or other filtering material, the insoluble carbonate of lime being left upon the filtering-bed. Heretofore this carbonate of lime has been allowed to waste, it being supposed that the cost of converting it into the oxide would be so great as to render it impracticable to recover it. Consequently the said carbonate of lime mixed with the sand composing the filter-bed has been permitted to accumulate. This carbonate of lime formed by causticizing the soda has accumulated so rapidly where any considerable quantity of soda has been causticized, as in pulp-mills, that the land or places available for depositing this waste or refuse has been used up.

It is the object of this invention to treat the carbonate of lime deposited upon the filtering-bed, and which has hitherto been looked upon as worthless, so that the greater part, if not the whole, of the carbonate, may be converted into the oxide, and that, too, at a commercial profit, the oxide thus recovered being capable of being employed to causticize more carbonate of soda.

In accordance with my invention the carbonate of lime deposited upon the filtering-bed is removed from the said filtering-bed and placed in troughs preferably located above and supported upon the filtering apparatus, usually tubs or vats containing the filtering-bed. When placed in the troughs referred to, the carbonate of lime is fed forward, preferably into a hopper, by screw conveyers located in the said troughs, the hopper having at its bottom a screw conveyer which feeds the carbonate of lime toward one end thereof. The carbonate of lime, which now holds more or less water, and which therefore is in a pasty condition, is preferably taken from the discharge or outlet end of the hopper referred to and carried to the drying apparatus by a series of buckets or scoops secured to a traveling chain or belt. The drying apparatus may consist of one or more flues having troughs provided with screw conveyers, by which the carbonate of lime is fed one to the other end of the said flues, from which it passes into one or more rotary calcining-furnaces, in which the carbonate is converted into the oxide, preferably by the heat from the products of combustion passing through the said rotary calcining-furnace, the recovered oxide of lime being discharged from the said rotary calcining-furnace upon the ground or into a suitable receptacle. The water held or absorbed by the carbonate of lime is driven off in the drying-flues referred to; but instead of a flue provided with troughs having screw conveyers, I may employ a second rotary furnace, in which the said carbonate may be dried, or I may accomplish both the drying and calcining in a single rotary furnace.

The particular features in which my invention consists will be pointed out in the claims at the end of the specification.

Figure 1 is a plan view of one form of my improved apparatus for the recovery of caustic lime employed in causticizing soda and other chemicals, the dust-chamber being shown in section; Fig. 2, a side elevation of Fig. 1; Fig. 3, a longitudinal section of part of the apparatus shown in Fig. 1, the section being taken on line *x x*; Fig. 4, a partial section and end elevation of Fig. 1, looking toward the right, showing only one drying-flue and one rotary furnace, to save space in the drawings; Fig. 5, a detail in section and elevation showing the hopper, the chute for the scoops or buckets, and the dust-chamber and chimney, the section being taken on the line $x\ x$, Fig. 1; Figs. 6, 7, and 8, details to be referred to, and Figs. 9 and 10 modifications to be referred to.

Referring to Fig. 1, A represents a series of tanks in which the soda is causticized, quicklime or oxide of lime being added to a solution of sodium carbonate placed therein, the oxide of lime being changed to a carbonate, while the carbonate of soda is changed to a hydrate—that is, caustic soda. The solution of caustic soda, with a carbonate of lime held in suspension, is discharged from the tanks into a filtering apparatus, herein shown as two pits or vats, L, by the pipes B B'. In practice a gate (not herein shown) will be placed at the junction of the branch pipes B' with the pipe B.

Each filtering pit or vat L is provided with a perforated bottom, (not shown,) upon which is placed a layer or bed of sand or other filtering material. The caustic soda in the pits L percolates through the filtering-bed and is run into suitable receptacles. (Not shown.) The insoluble carbonate of lime is deposited on the filtering-bed, and after the caustic soda has filtered off the said carbonate of lime is transferred to troughs C C', preferably supported by and extended longitudinally across the filtering-vats.

The troughs C C' have their discharge-outlet, as herein shown, located above a hopper, H, the trough C being shown as made with two branches at right angles to each other. Each branch of the trough C is provided with a screw conveyer, $a^4$, extended longitudinally through the said branch and provided with a belt-pulley, $a^5$, and the trough $a^3$ is also provided with a screw conveyer having upon its shaft $a^6$ a belt-pulley, $a^7$, the pulley $a^7$ being shown as connected by belt $a^8$ with a pulley, $a^9$, on a counter-shaft, $a^{10}$, driven by a main shaft, $a^{12}$, (see Fig. 1,) wherein the said shafts are shown by single lines.

The carbonate of lime discharged from the hopper H in a substantially-pasty condition is fed forward toward one end of the said hopper by a screw conveyer, (not shown,) the shaft $b$ of which is driven by a belt, $b'$, passed about a pulley, $b^2$, on the said shaft and about a pulley, $b^3$, on the counter-shaft $a^{10}$. (See Figs. 1 and 2.) The carbonate of lime is taken from the discharge end of the hopper H, and, as shown, is carried up a chute, K, (see Fig. 5,) by means of any usual or suitable scoops or buckets attached to a belt or chain passed about a pulley on the shaft $b^4$ at the upper end of the chute and about a pulley on the shaft $b$ at the lower end of the said chute, the said scoops or buckets and belt and pulleys necessary to drive them being not herein shown, their construction and arrangement being so well known as to need no specific description.

The shaft $b^4$ is rotated by a belt, $b^5$, passed about a pulley, $b^6$, thereon and about a pulley, $b^7$, on the counter-shaft $a^{10}$. The carbonate of lime carried up the chute K by the scoops or buckets referred to is discharged, as herein shown, through a funnel, $b^8$, (see Fig. 5,) into a trough, I, supported transversely above flues F F', the said flues being hereinafter designated by me as "drying-flues." The trough I has a screw conveyer, the shaft $c$ of which is driven from the main shaft $a^{12}$ by a belt, $c'$.

Each flue F F', as herein shown, contains at one end a trough, T, and near its top or upper part each of the said troughs receives the pasty or wet carbonate of lime from the trough I through a chute, $c^2$. The pasty carbonate of lime is fed forward in each trough T by a screw conveyer, the shafts $c^3$ of which are rotated by the counter-shaft $a^{10}$ through the belts $c^4\ c^5$. (See Fig. 1.) The pasty or wet carbonate of lime is discharged from each trough T into a second trough, T', located below the discharge end of the trough T. (See Fig. 3.)

That portion of the drying-flues F F' in which the trough T' is located is inclosed, as herein shown in Fig. 3, by brick-work M, to keep that end of the said flue hotter than the front end, the water absorbed or held by the carbonate of lime being driven off in the said drying-flues. The carbonate of lime in the troughs T' is fed forward by a screw conveyer having its shaft $c^6$ rotated by the counter-shaft $a^{10}$ through the belt $c^7$. The trough T' in each flue is preferably inclined toward its discharge end, as shown in Fig. 3, to facilitate the feed of the carbonate of lime. The carbonate of lime discharged from the trough T' is substantially dry, the said carbonate being discharged, as herein shown in Fig. 3, onto an incline part, $d$, of the brick-work M. The carbonate falls from the incline $d$ into a rotary calcining-furnace, V, which may be rotated in any usual or well-known manner. The dry carbonate of lime in the rotary calcining-furnace V is converted into the oxide, carbonic-acid gas being driven off by the heat from the products of combustion of a furnace, J, into which the discharge end of the rotary calcining-furnace is projected, the fire box or chamber of the said furnace being provided with a bridge, $d'$, to separate it from the said rotary calcining-furnace.

Between the bridge $d'$ and the end of the calcining-furnace V, and below the latter, is a hopper, $d^2$, having its bottom closed by a valve, $d^3$, (shown in Figs. 3 and 8,) which may be operated by a rod, $d^4$, extended to the outside of the furnace, the hot oxide of lime discharging from the calcining-furnace and falling through the hopper $d^2$ into the chamber 3.

The organic matter, which may be carried along by the carbonate of lime to the calcining-furnace, is completely burned off in the said furnace, so that the oxide of lime discharged into the chamber 3 is substantially free from impurities.

The flues F F', as herein shown, are extended into a dust-chamber, E, which communicates with the chimney D through the passage 20. (See Fig. 3.) The dust-chamber E is intended to receive dry carbonate of lime, which may be carried back through the flues by the draft of the chimney D.

Instead of the flue F and the troughs T T', located therein, I may employ as the drying-chamber a second rotary furnace, V, as shown in Fig. 10, the pasty carbonate of lime being discharged into the second rotary furnace V' through the chute or spout s, connected with the chute K; or I may dispense with the independent drying-chamber and have the calcining-furnace V perform the office of drying and calcining, as shown in Fig. 9, the pasty carbonate of lime being discharged from the chute K directly upon the incline $d$ through the orifice $e^2$ in the brick-work M.

I claim—

1. In an apparatus for the recovery of lime employed in causticizing soda or other chemicals, a filtering apparatus, L, a hopper, H, and a conveyer to carry the carbonate of lime formed in the process of causticizing from the said filtering apparatus to the said hopper, combined with a rotary calcining-furnace and with means, substantially as described, to convey the carbonate of lime from the said hopper to the said rotary calcining-furnace, substantially as described.

2. In an apparatus for the recovery of lime employed in causticizing soda or other chemicals, a filtering apparatus, L, a hopper, H, and a conveyer to carry the carbonate of lime formed in the process of causticizing from the said filtering apparatus to the said hopper, combined with a rotary calcining-furnace and with the chute K and scoops or buckets therein to convey the carbonate of lime from the said hopper to the said calcining-furnace.

3. In an apparatus for the recovery of lime employed in causticizing soda or other chemicals, a filtering apparatus, L, a hopper, H, and a screw conveyer to carry the carbonate of lime formed in the process of causticizing from the said filtering apparatus to the said hopper, a combustion-furnace, and a rotary calcining-furnace having one end extended into the said combustion-furnace, combined with means, substantially as described, to convey the carbonate of lime from the said hopper to the said calcining-furnace, substantially as specified.

4. In an apparatus for the recovery of lime employed in the causticizing of soda or other chemicals, a filtering apparatus, L, and a rotary calcining-furnace connected therewith, combined with means, substantially as described, to convey the carbonate of lime formed in the process of causticizing from the said filtering apparatus to the calcining-furnace, substantially as described.

In testimony whereof I have signed my name to this specification in the presence of two subscribing witnesses.

GEO. W. HAMMOND.

Witnesses:
G. W. GREGORY,
JAS. H. CHURCHILL.